D. B. FLEMING.
COFFEE CONDENSER.
APPLICATION FILED MAY 21, 1909.
958,616.
Patented May 17, 1910.
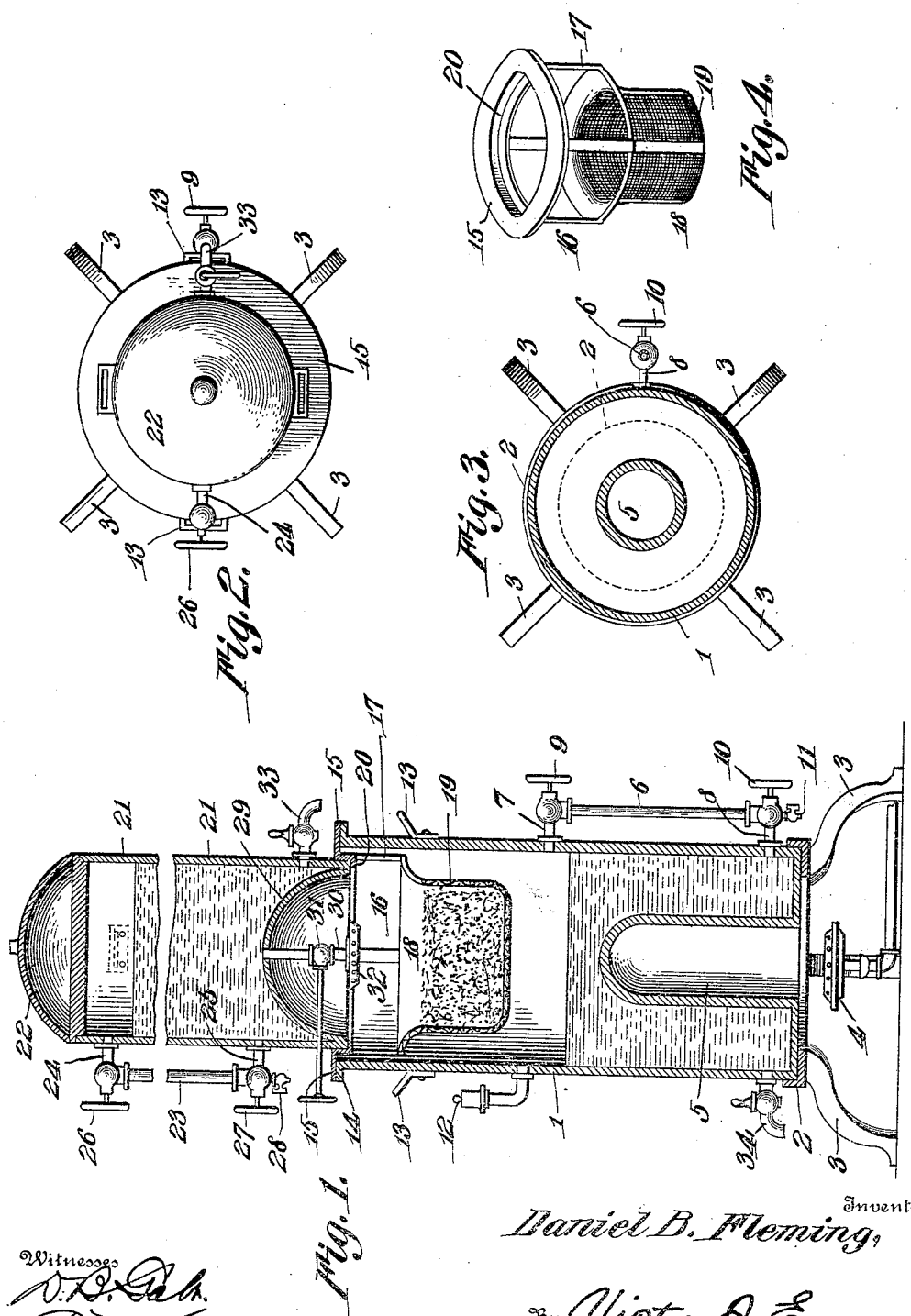
Inventor
Daniel B. Fleming,
By Victor J. Evans.
Attorney.
Witnesses

UNITED STATES PATENT OFFICE.

DANIEL B. FLEMING, OF HARTFORD, ARKANSAS.

COFFEE-CONDENSER.

958,616.   Specification of Letters Patent.   Patented May 17, 1910.

Application filed May 21, 1909. Serial No. 497,513.

*To all whom it may concern:*

Be it known that I, DANIEL B. FLEMING, a citizen of the United States, residing at Hartford, in the county of Sebastian and State of Arkansas, have invented new and useful Improvements in Coffee-Condensers, of which the following is a specification.

This invention relates to coffee condensers, the object in view being to provide a device of the class described embodying a number of readily separable sections adapted to be easily combined, the device comprising a boiler and a water container detachably mounted thereon, each of said parts being provided with sight gages whereby the level of the contents thereof may be observed at all times, the device also embodying a detachable coffee grounds basket or holder, a condenser dome arranged over the basket, and means for spraying water over and upon the contents of said basket.

To the above end, the invention consists in the novel construction, combination and arrangement of parts as herein fully described, illustrated and claimed.

In the accompanying drawing:—Figure 1 is a vertical diametrical section through a coffee condenser embodying the present invention. Fig. 2 is a plan view thereof. Fig. 3 is a horizontal section taken through the lower portion of the boiler. Fig. 4 is a detail perspective view of the coffee basket.

The coffee condenser comprises essentially a boiler 1 which is preferably cylindrical and mounted upon a supporting seat or bottom frame 2, held at a suitable elevation by means of legs 3 to adapt the burner 4, of any style, to be arranged under the boiler and beneath a central hollow core 5 which is open at its lower end and extends upward centrally within the boiler 1, as clearly shown in Fig. 1, thereby giving increased heating space and enabling the contents of the boiler to be heated with greater rapidity. The boiler comprises also a coffee gage 6 of glass having connections 7 and 8 at its upper and lower ends leading into the body of the boiler, each of said connections being controlled by valves, 9 designating a blow-off valve controlling the upper connection 7 and 10 designating the gage valve controlling the lower connection 8. 11 designates a blow-off or drain-cock at the lower end of the gage. 12 designates a pop valve which communicates with the steam space above the normal liquid level, as shown in Fig. 1. The boiler is also provided with suitable lifting and carrying handles 13.

Supported in the upper part of the boiler is a coffee grounds basket 16, which consists of an open-work cylindrical structure composed of a ring at its top from which depends vertical bars 17 that support at their lower ends a reticulated cup 19, the bars being bent inwardly at points intermediate their ends to support the cup, which is of less diameter than the upper portion of the basket. By thus reducing the lower end of the basket at 18, the steam can pass through the meshes of the pocket, both at the bottom and around the sides. Steam can also pass through the basket through the ports or openings formed between the upper ends of the bars 17. The basket is supported within the boiler by means of the exterior annular flange formed on the upper end of the basket and which rests on the circumferential flange 14 of the boiler. This basket is adapted to contain the coffee grounds and permits the water to percolate through the coffee and drip down into the boiler space below. In forming the flange 15 at the top of the basket 16, an internal seat 20 is formed for the lower end of a water condenser 21 which is also preferably cylindrical in shape and provided with a suitable cap or cover 22.

In order to preserve the level of water in the container 21, the same is provided with a water sight gate 23 having upper and lower connections 24 and 25 leading into the container and controlled by upper and lower cut-off valves 26 and 27, respectively.

28 designates a drain valve for the gage 23.

At its lower end the water container 21 embodies a hollow hemispherical condenser dome 29 forming a part of the water container and lying directly over the basket 16. Communicating with the highest point and center of the dome 29 is a water tube 30 controlled by a valve or cut-off 31 while connected to the lower end of the tube 30 is a sprayer 32 provided with a large number of perforations adapted to spray water over the contents of the coffee basket 16.

33 designates a faucet for drawing off the contents of the water container and 34 designates a similar faucet for drawing off the contents of the boiler.

I claim:—

1. A coffee condenser comprising a lower boiler section open at its top, a basket set into the upper end of the boiler section, a water container section set into the basket and having its bottom formed into a condensing dome, and means inclosed within the dome and controlled from the outside of the container for supplying water to the basket, said basket consisting of a perforated coffee grounds containing cup of less diameter than the boiler to provide an annular space around the same, and members extending upwardly from the cup to support the same below the bottom of the water container to permit steam to pass over the cup to the condensing dome.

2. A coffee condenser comprising a cylindrical boiler open at its top, a basket including a top ring having an external flange resting on the top of the boiler and an internal flange forming a seat, members depending from the ring, a reticulated cup supported by the members at a point below the top of the boiler and above the water level therein, a water container set into the ring and supported on said seat and having its bottom formed into a dome, a supply pipe supported by the dome and terminating above the cup and independent thereof, and a valve for controlling the flow through the pipe.

In testimony whereof I affix my signature in presence of two witnesses.

DANIEL B. FLEMING.

Witnesses:
HENRY LOOS,
U. S. BUZAU.